(12) United States Patent
Biber

(10) Patent No.: US 11,573,326 B2
(45) Date of Patent: Feb. 7, 2023

(54) SIMULTANEOUS LOCALIZATION AND MAPPING IN 2D USING A 3D-SCANNER

(71) Applicant: Robert Bosch GmbH, Stuttgart (DE)

(72) Inventor: Peter Biber, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 16/868,017

(22) Filed: May 6, 2020

(65) Prior Publication Data

US 2020/0371241 A1 Nov. 26, 2020

(30) Foreign Application Priority Data

May 21, 2019 (DE) .......................... 102019207448.0

(51) Int. Cl.
*G01S 17/89* (2020.01)
*G01C 21/32* (2006.01)
*G01S 7/48* (2006.01)
*G05D 1/00* (2006.01)

(52) U.S. Cl.
CPC .............. *G01S 17/89* (2013.01); *G01C 21/32* (2013.01); *G01S 7/4808* (2013.01); *G05D 1/0088* (2013.01); *G05D 2201/0213* (2013.01)

(58) Field of Classification Search
CPC ..... G01S 17/89; G01S 17/4808; G01C 21/32; G05D 1/0088; G05D 2201/0213
See application file for complete search history.

(56) References Cited

U.S. PATENT DOCUMENTS

| | | | |
|---|---|---|---|
| 2013/0314688 A1* | 11/2013 | Likholyot | G01S 17/89 356/3.13 |
| 2019/0079193 A1* | 3/2019 | Gunnam | G01S 7/4808 |
| 2020/0200912 A1* | 6/2020 | Chen | G06V 20/58 |

* cited by examiner

Primary Examiner — James M McPherson
Assistant Examiner — Bakari Underwood
(74) Attorney, Agent, or Firm — Norton Rose Fulbright US LLP; Gerard Messina

(57) ABSTRACT

A method for the simultaneous localization and mapping in 2D using a 3D scanner. An environment is scanned with the aid of the 3D scanner in order to generate a three-dimensional representation of the environment in the form of a 3D pixel cloud made up of a multitude of scanned pixels. A two-dimensional representation of the environment in the form of a 2D pixel cloud is subsequently generated from the 3D pixel cloud. The 2D pixel cloud is conveyed to a 2D SLAM algorithm for the generation of a map of the environment and for the simultaneous ascertainment of the current position of the 3D scanner within the map.

15 Claims, 4 Drawing Sheets

SIMULTANEOUS LOCALIZATION AND MAPPING IN 2D USING A 3D-SCANNER

CROSS REFERENCE

The present application claims the benefit under 35 U.S.C. § 119 of German Patent Application No. DE 102019207448.0 filed on May 21, 2019, which is expressly incorporated herein by reference in its entirety.

FIELD

The present invention relates to a method for the simultaneous localization and mapping in 2D using a 3D-scanner. In addition, the present invention relates to a corresponding system for carrying out the method.

BACKGROUND INFORMATION

Autonomous vehicles are dependent on a continual determination of the own position or location. In addition to methods that have to rely on a detailed map of the environment for the localization, conventional methods allow for a localization in unknown or continuously changing environments. Among others, in the case of mobile robots, for example, or autonomous vehicles such as autonomous shuttles for the transport of persons, or what are known as AGVs (automatic guided vehicles) for the transport of containers in ports, there are also localization methods in use which make it possible to map the environment. In this so-called SLAM (Simultaneous Localization and Mapping) technology, the localization and mapping are carried out in a continual interplay, so that an infrastructure-free localization is provided. The SLAM technology has progressed quite far, in particular when using a 2D-laser system. In the 2D lidar SLAM, a flat world is assumed in which the structures are mainly of a two-dimensional nature. This makes it possible for a 2D laser scanner, which measures horizontally at a defined level, to sense the structures to be acquired with sufficient accuracy. While this approach works well on level surfaces such as in enclosed spaces, the aforementioned 2D assumption of a flat world generally does not apply to the outdoor area. The base plane or road need not necessarily be level, and there are also many structures such as hills or bushes that are not purely vertical. A standard 2D lidar or SLAM is therefore unable to provide the necessary reliability and precision in the outdoor area. One alternative here is the use of 3D-laser scanners and the development of a 3D SLAM system. However, all six degrees of freedom (DOF) of the movement (x, y, z, roll, pitch, yaw) must be determined in such a 3D SLAM system. As a result, there is also a clearly greater degree of complexity in the 3D SLAM system in comparison with a 2D SLAM system, in which only three degrees of freedom (x, y, yaw) have to be determined. Because of the more complex algorithms, the computational effort and the computational time become greater.

SUMMARY

It is an object of the present invention to provide a possibility of reducing the computational effort when using a 3D scanner. This object may be achieved by an example method in accordance with the present invention. In addition, the object may be achieved by an example system in accordance with the present invention, and also by an example vehicle in accordance with the present invention. Additional advantageous embodiments are described herein.

According to the present invention, an example method is provided for the simultaneous localization and mapping in 2D using a 3D scanner, in which an environment is scanned with the aid of the 3D scanner in order to generate a three-dimensional representation of the environment in the form of a 3D pixel cloud. Next, a two-dimensional representation of the environment in the form of a 2D pixel cloud is generated from the 3D pixel cloud. Finally, the 2D pixel cloud is conveyed to a 2D SLAM algorithm for the generation of a map of the environment and for the simultaneous ascertainment of the position of the 3D scanner within the map. By converting the 3D pixel cloud into a 2D pixel cloud, the amount of data to be processed is markedly reduced. This allows for the use of a 2D SLAM algorithm, which makes it possible to carry out a localization and simultaneous mapping of the environment at a considerably lower computational effort. As a result, a corresponding method is also able to be used in a vehicle that has a relatively low computational capacity.

In one specific embodiment, it is provided to compensate for the movement executed by the 3D scanner during a scanning operation. In the process, an odometry datum is first ascertained, which represents a displacement of the scanner in six degrees of freedom. Next, the position of the 3D scanner is then determined for each measured 3D point based on the odometry datum during a measurement of the respective point, and the measured point is then determined from there. An effective undistortion of the 3D pixel cloud that was distorted by the movement of the 3D scanner during the scanning operation is able to be achieved with the aid of this measure.

In one further specific embodiment, it is provided that the odometry datum is generated by fusing measuring data of a vehicle odometry system with measuring data of an inertial measuring unit. This then makes it possible to ascertain a displacement of the 3D scanner in all six degrees of freedom in a particularly uncomplicated manner.

In one further specific embodiment, it is provided that the 3D pixel cloud is transformed into a coordinate system whose z-axis is aligned in parallel with the direction of gravity so that the origin corresponds to a selected instant in time, with the 3D pixel cloud being transformed into a coordinate system whose z-axis is aligned in parallel with the direction of gravity. With the aid of this measure, an alignment of the 3D pixel cloud is achieved that is independent of possibly existing tilting of the 3D scanner at a measuring instant.

In one further specific embodiment, it is provided that vertical structures in the 3D pixel cloud are extracted in that a normal estimate is carried out for each pixel of the 3D pixel cloud and the particular pixels of the 3D pixel cloud whose normal component in a vertical direction is greater than a predefined threshold value are then discarded. By discarding pixels that represent horizontal or oblique areas of the scanned objects, the amount of measuring data to be processed is considerably reduced. This makes it possible to greatly reduce the computational effort required for carrying out the 2D SLAM method.

In one further specific embodiment, it is provided that the 3D pixel cloud is projected into a two-dimensional coordinate system in which a vertical component is discarded for each of the pixels of the 3D pixel cloud. By projecting the 3D pixel cloud onto a two-dimensional plane, the measuring data are prepared for use in a 2D SLAM algorithm.

In one further specific embodiment, it is provided that the number of pixels of the 3D pixel cloud is reduced with the aid of a Voxel filter and/or by regular undersampling. Because of the thereby obtained reduction of the measuring data, the computational effort required for carrying out the 2D SLAM method is able to be considerably reduced. For example, the use of a Voxel filter allows certain space areas to be preferred, e.g., the front region or regions at a certain height. The use of regular undersampling, on the other hand, represents a particularly simple method for reducing data.

In one further specific embodiment, it is provided that a known starting position is first initialized for the localization. Next, a SLAM graph is prepared with an initial node and an allocated unary factor, which encodes the initial position. The current position for each current scan is then predicted with the aid of the current, ascertained odometry datum. In a next step, scan matching with the predicted, current position as a starting estimate is carried out. A new node is then generated in the SLAM graph with a binary edge to the preceding node and the scan matching as a unary edge.

In addition, in accordance with the present invention, an example system is provided for the simultaneous localization and mapping in 2D based on a 3D scanner, the system including a 3D scanner which is developed to generate a three-dimensional representation of an environment in the form of a 3D pixel cloud, and a control device for the simultaneous localization and mapping in 2D. The control device is developed to generate from the 3D pixel cloud a two-dimensional representation of the environment in the form of a 2D pixel cloud. In addition, the control device is developed to convey the 2D pixel cloud to a 2D SLAM algorithm for the generation of a two-dimensional map of the environment and a simultaneous ascertainment of the current position of the 3D scanner within the map. By converting the 3D pixel cloud into a 2D pixel cloud, the amount of data to be processed is markedly reduced. This allows for the use of a 2D SLAM algorithm with whose aid it is possible to carry out a localization and simultaneous mapping of the environment at a markedly lower computational effort. As a result, a corresponding system is able to be used also in a vehicle that has a relatively low computing capacity.

In one specific embodiment, it is provided that the system additionally includes an odometry measuring device for ascertaining an odometry datum, which represents a displacement of the 3D scanner during a scanning operation in six degrees of freedom. The control device is developed to compensate for a movement of the 3D scanner. In addition, the control device is developed to determine for each scanned pixel of the 3D pixel cloud the current position of the 3D scanner during a measurement of the respective pixel based on the odometry datum and then to determine the measured pixel from there. With the aid of this measure, an effective undistortion of the 3D pixel cloud distorted by the movement of the 3D scanner during the scanning process is then able to be achieved.

In one further specific embodiment, the control device is moreover developed to transform the 3D pixel cloud into a coordinate system whose z-axis is aligned in parallel with the direction of gravity. With the aid of this measure, an alignment of the 3D pixel cloud is achieved that is independent of tilting of the 3D scanner that may possibly exist at the measuring instant.

In another specific embodiment, the control device is furthermore developed to extract vertical structures on the basis of the 3D pixel cloud in that a normal estimate is carried out for each pixel of the 3D pixel cloud and the particular pixels of the 3D pixel cloud are then discarded whose normal component in a vertical direction is greater than a predefined threshold value. By discarding pixels that represent horizontal or oblique areas of the scanned objects, the amount of measuring data to be processed is considerably reduced. This makes it possible to markedly reduce the computational effort required to carry out the 2D SLAM method.

Finally, a vehicle having a corresponding system is provided. Such a vehicle has the ability to carry out the preparation of a map of its environment and the simultaneous localization of its position within the map at a relatively low computational effort. This provides for a particularly rapid orientation of the vehicle even in an environment that is unknown to the vehicle, and thereby enhances the driving safety.

Below, the present invention will be described in greater detail with the aid of figures.

DETAILED DESCRIPTION OF EXAMPLE EMBODIMENTS

The example embodiments of the present invention described herein makes it possible to use the sensor data from a 3D scanner for the setting up a map and for a simultaneous localization with the aid of a 2D SLAM system. Toward this end, the sensor data of the 3D scanner are adapted by a series of preprocessing steps and the use of an additional odometry sensor system in such a way that the sensor data are able to be used by a 2D SLAM system. A movement compensation is first performed for each 3D scanner and the 3D scanner then brought into a standardized orientation. Next, vertical structures are extracted from the 3D scan and a 2D pixel cloud is generated therefrom. It is then incorporated into a 2D SLAM system. For instance, the overall system, which is made up of a sensor, a data processor and an actuator, may be used for the navigation of autonomous robots (e.g., an autonomous shuttle or AGV). Toward this end, the invention described here supplies the current position and orientation of the vehicle at all times, which are then used as the basis for the path planning and execution and ultimately for the generation of engine commands. As a matter of principle, however, applications are also possible in which the localization runs passively in a system that is controlled in some other manner (e.g., manually), while the localization is used for other purposes (e.g., for state monitoring).

Figure 1:
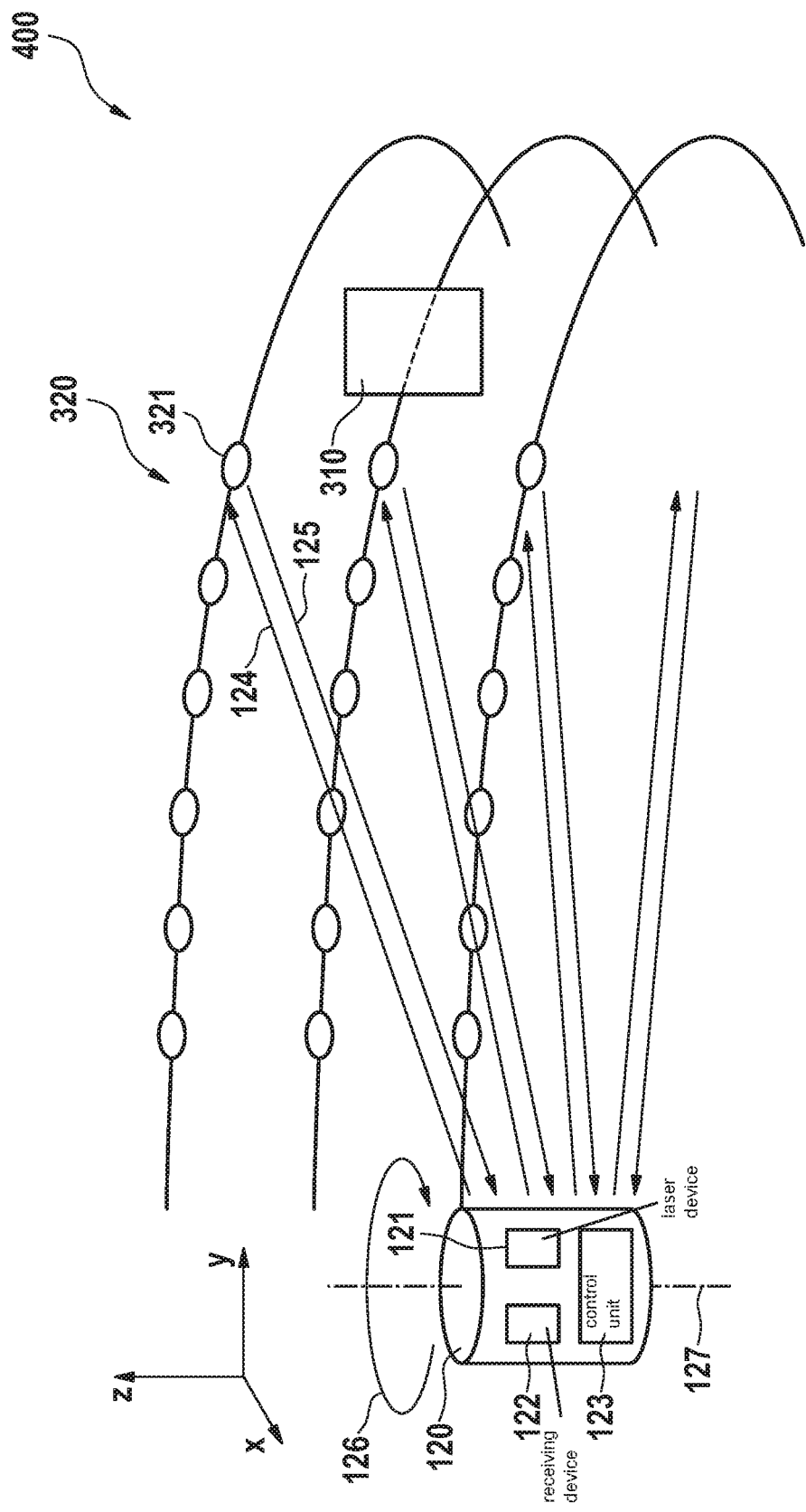
FIG. 1 shows, in schematic form, a 3D scanner while it is scanning an environment.

In particular a 3D laser scanner which is embodied in the form of a rotating lidar system, for example, may be used as the 3D scanner. Such a rotating lidar system 120 is schematically illustrated in FIG. 1. Lidar system 120 includes a housing in which a laser device 121 and a receiving device 122 are situated. Laser device 121 includes at least one laser source for generating laser radiation in the form of transmitting laser beams 123. Receiving device 122, on the other hand, includes at least one detector for detecting the laser radiation reflected at objects 310 in environment 300, which impinges upon receiving device 122 in the form of receive laser beams 124. In addition, lidar system 120 typically also includes a control unit 123 for the control of laser device 121 and receiving device 122, which is likewise situated in the same housing in this particular example. In a typical rotating 3D laser scanner 120, laser device 121 simultaneously generates a plurality of laser beams 123, which scan a different scanning point 321 of environment 300 in each case, with the scanning points 321 simultaneously acquired by 3D laser scanner 120 usually being arranged in the form of columns relative to one another. By a rotational movement 126 about a usually vertical axis of rotation 127 (parallel to the z-axis), lidar system 120 successively scans a defined angular range of environment 300 during each scanning period. Pixels 321 scanned during a full scanning period form a 3D pixel cloud 320, which is available as a three-dimensional representation of environment 300 of 3D scanner 120 for further processing.

Figure 2:
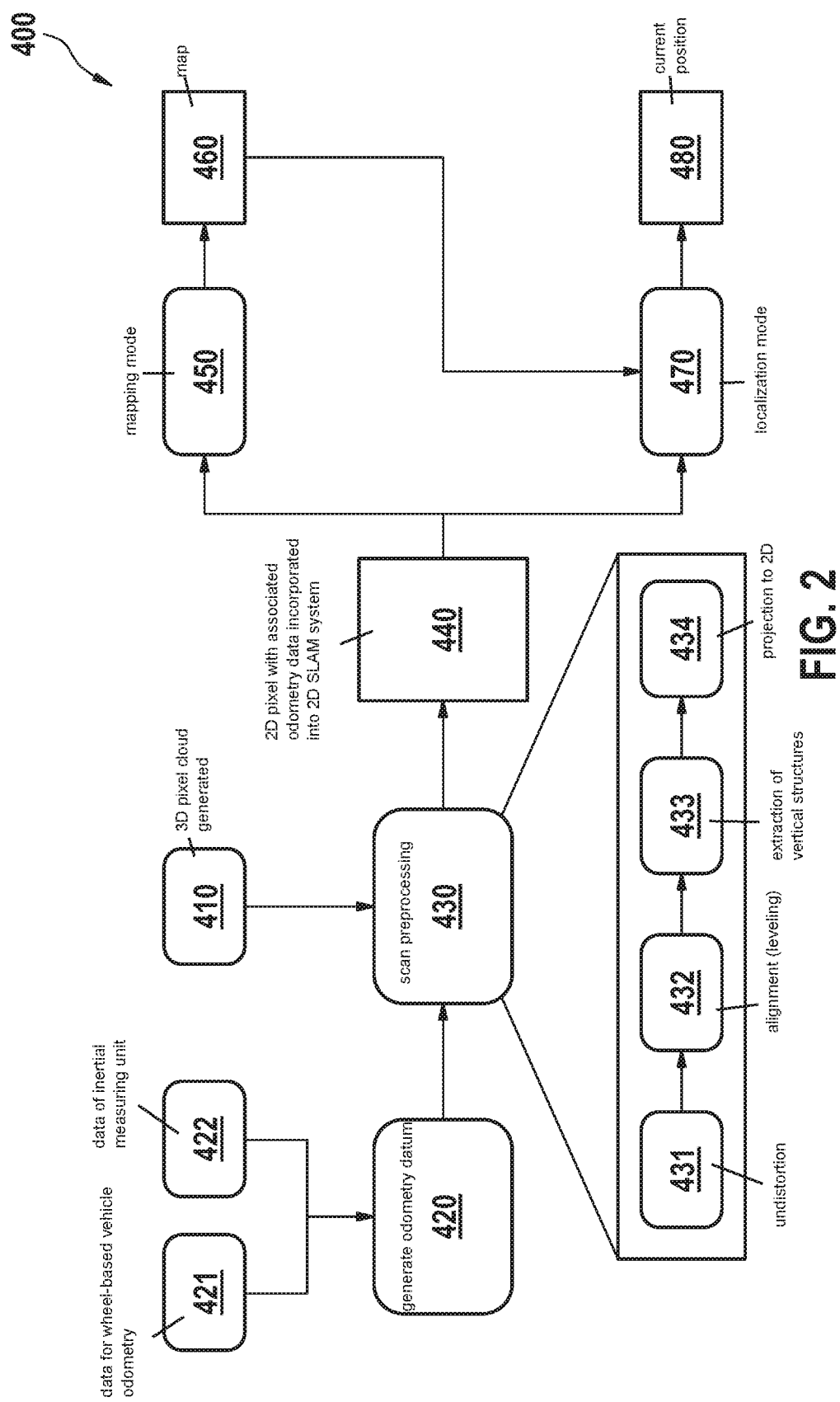
FIG. 2 shows a schematic flow diagram to illustrate an example method according to the present invention.

In the conventional approach, the scanner data present in the form of 3D pixel cloud 320 are directly conveyed to a 3D SLAM algorithm for the generation of a three-dimensional map of environment 300 and for the simultaneous determination of an ego position and orientation within the three-dimensional map. In the example method according to the present invention, on the other hand, the scanner data are first subjected to special preprocessing through which the 3D pixel cloud 320 is transformed into a 2D pixel cloud. This 2D pixel cloud is subsequently supplied to a 2D algorithm for the preparation of a two-dimensional map and a simultaneous determination of the ego position and orientation within the two-dimensional map. The present invention provides a series of processing steps for the transformation of the pixel cloud, which will be described in greater detail in the following text. In this context, FIG. 2 shows a simplified flow diagram 400, which illustrates the sequence of the example method according to the present invention. In step 410, 3D pixel cloud 320 is first generated in that a 3D scanner 120 scans environment 300. In parallel and generally independently thereof, an odometry datum is generated in method step 420, which describes a change in position of vehicle 200 in six degrees of freedom (X, Y, Z, roll angle, pitch angle and yaw angle). This is done with the aid of odometry measuring device 130, which includes a vehicle odometry 132 based on a measurement of the wheel revolutions (see FIG. 4), and an inertial measuring unit (IMU), which senses the movement in space of vehicle 200 based on accelerations that are acting on vehicle 200. The output of this step is a 6-DOF prediction of the vehicle trajectory. The term "6-DOF" stands for the six degrees of freedom, i.e., the three directions in space x, y and z, as well as the three angles that describe the rolling, pitching and yawing of vehicle 200. For this purpose, the data of wheel-based vehicle odometry 132 (421), which take the wheel speed and possibly also the steering angle into account, are fused with the data of inertial measuring unit 131 (422). Different conventional methods are available for this purpose. The coordinate system of the fused odometry system has a planar alignment, which means that the z-axis of the coordinate system coincides with the direction of the gravitational axis. In this particular exemplary embodiment, the data from inertial measuring unit 131 are pre-fused and provide the full orientation (roll, pitch, yaw). The distance traveled is calculated from the odometry data of wheel-based vehicle odometry 132 and is plotted against the orientation ascertained with the aid of inertial measuring unit 131. The corresponding odometry data, i.e. the traveled distance and the change in orientation of vehicle 200, are basically also ascertainable with the aid of other sensors of vehicle 200, such as by an evaluation of sensor data acquired with the aid of video camera 140 or radar sensor 160, or by an evaluation of the position data ascertained with the aid of the satellite navigation.

In method step 430, scan preprocessing takes place. In this context, the stream of sensor data of 3D sensor scanner 120 continually generated in method step 410, as well as the 6-DOF odometry data continuously generated in method step 420 are used as input variables. The term 'scan' denotes a data packet of 3D scanner 120 and is made up of corresponding sensor data of a full 360° rotation during which an n number of pixels 321 is measured. In addition, the precise measuring instant is known for each pixel 321. The scan preprocessing is made up of a plurality of sub-steps: undistortion 431, alignment (leveling) 432, extraction of vertical structures 433, and projection to 2D 434.

In the method step of undistortion 431, a compensation for the movement (that is to say, the displacement and rotation) of 3D scanner 120 during the scanning process takes place. Based on the time information of respective pixel 321, the position of 3D scanner 120 is first determined for each pixel 321 of 3D pixel cloud 320 with the aid of the 6-DOF odometry, and measured pixel 321 is subsequently determined from there. After this step, a compensation of the movement of the 3D scanner in the coordinate system of the 6-DOF odometry takes place.

In the method step of leveling 432, undistorted 3D pixel cloud 320 is now transformed into an aligned coordinate system whose z-axis is aligned in parallel with the direction of gravity. The transformation is performed in such a way that the origin corresponds to a selected point in time, e.g., the end of the currently processed scan.

In the method step of extracting vertical structures 433, vertical structures within 3D pixel cloud 320 such as building walls are extracted. For this purpose, a normal estimate is performed for each pixel 321 of undistorted and aligned 3D pixel cloud 320. The vertical and horizontal components of the area normal of respective pixel 321 are ascertained. Next, the particular pixels 321 from pixel cloud 320 whose normal component in a Z-weighting is smaller than a predefined threshold value are extracted. Only extracted pixels 321 are retained while remaining pixels 321 of 3D pixel cloud 320 are discarded.

In the method step of projection into 2D, the z-component of pixels 321 remaining in 3D pixel cloud 320 are discarded because they are no longer needed. As an option thereto, the size of the pixel cloud is reduced in order to achieve more rapid processing thereafter. For example, this may be accomplished with the aid of a Voxel filter in which only pixels 321 of a certain position are retained, e.g., of a certain level. In addition, the size of the pixel cloud may also be reduced by regular undersampling, in which only certain pixels 321 are retained and the others are discarded.

At the end of the scan preprocessing 430, a 2D pixel is ultimately obtained together with the associated odometry data. (440). This information is then incorporated into a 2D SLAM system, which has two modes, i.e., a mapping mode 450 and a localization mode 470. In the mapping mode, the 2D SLAM system generates a map 460 of environment 300. In this particular exemplary embodiment, the map is made up of a selected number of scans and their positions. In localization mode 470, a large 2D pixel cloud is calculated therefrom. Map 460 therefore is a large pixel cloud in which only the 2D component (x, y) is utilized any longer.

The localization supplies a current position (480) for each input scan, with the position describing both the position (x, y) and the orientation (yaw angle or yaw) in 2D. At the start of the present method, the localization is initialized by a known starting position, and what is termed a SLAM graph with an initial node and an allocated unary factor is set up which encodes the initial position. For each preprocessed scan, the position is predicted with the aid of the also supplied odometry. Next, scan matching with the predicted position as a starting estimate is carried out. For instance, this is accomplished with the aid of an ICP algorithm in which the correction calculation is performed in an iterative manner.

Then, a new node with a binary odometry edge to the previous node and the result of the scan-matching step as a unary map in the SLAM graph. This fusion schema based on a SLAM graph corresponds to what is known as a pose graph localization method.

Figure 3:
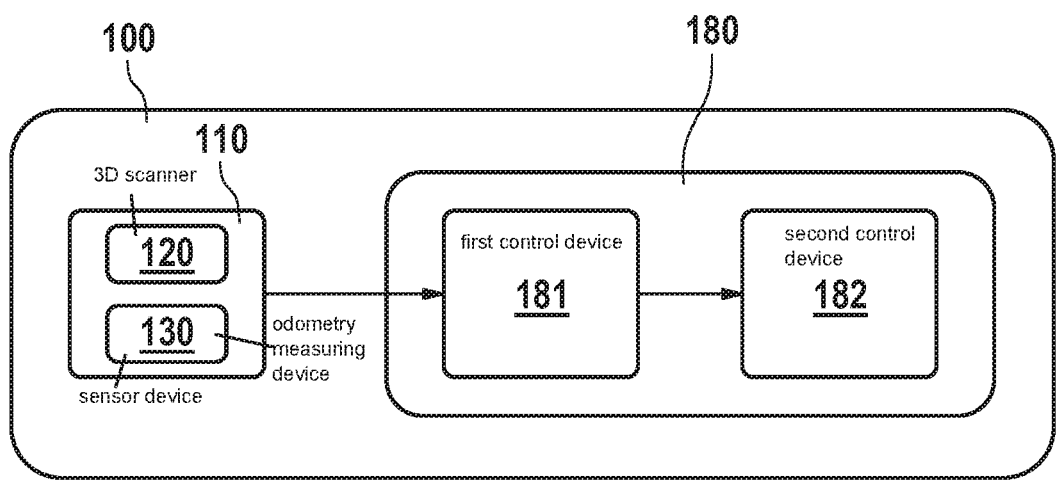
FIG. 3 shows a block diagram of the system according to the present invention having a sensor device, which includes a 3D scanner and an odometry system, and a control device.

FIG. 3 shows a block diagram of a system 100 according to the present invention for the simultaneous localization and mapping in 2D using a 3D scanner 120. System 100 includes a sensor device 110 which includes a 3D scanner 120 for acquiring 3D pixel cloud 320 and an odometry measuring device 130 for acquiring odometry data of vehicle 200. In addition, system 100 has a control device 180 for carrying out a 2D SLAM method with the aid of pixel cloud 321. Toward this end, control device 180 has a first control device 181 for preprocessing the sensor data supplied by sensor device 110, with the 3D pixel cloud being transformed into a suitable 2D pixel cloud, and a second control device 182 for carrying out the 2D SLAM method based on the previously generated 2D pixel cloud. In this particular exemplary embodiment, the two control devices 181, 182 are embodied as separate processing units. Generally, however, the two control devices 181, 182 may also be realized in the form of a common processing unit on which all processing steps of the method according to the present invention will then be carried out.

Figure 4:
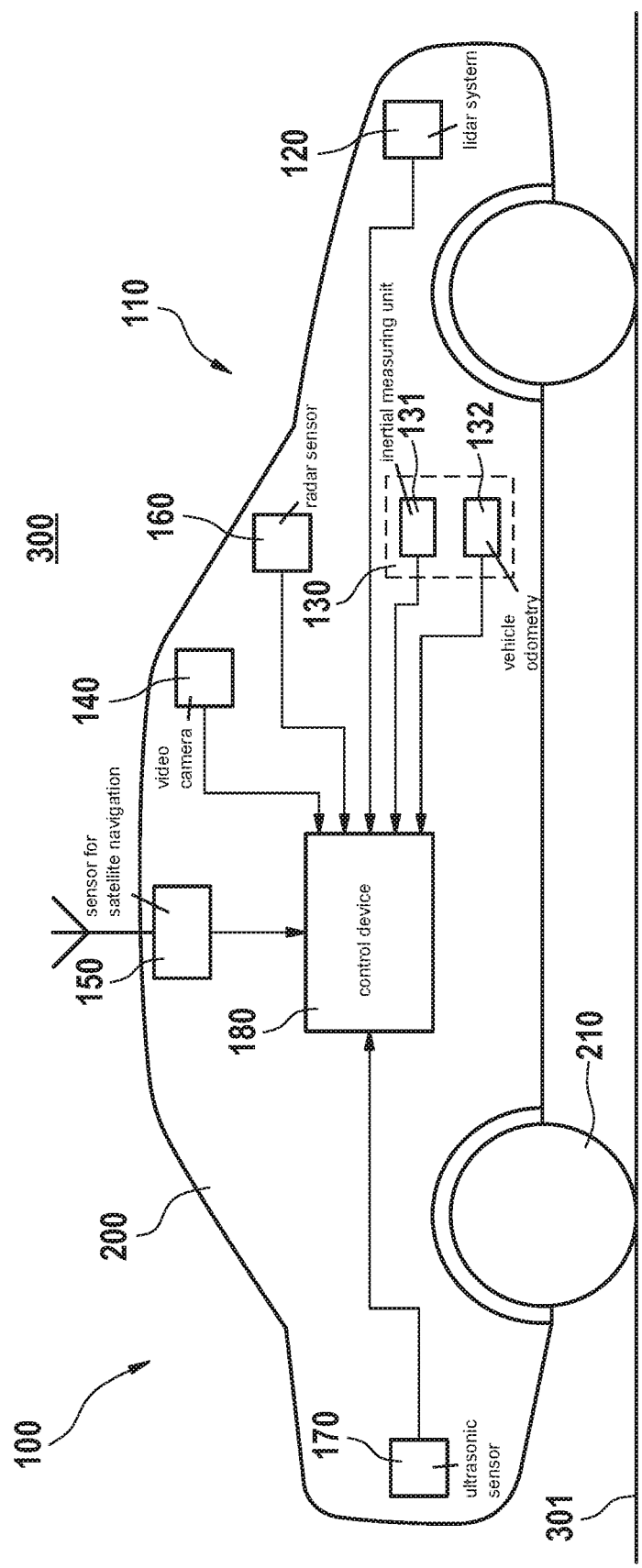
FIG. 4 shows, in schematic form, a vehicle having the system from FIG. 3, which includes the 3D scanner and further sensors.

FIG. 4 schematically illustrates a vehicle 200 having system 100 from FIG. 3. System 100 includes a vehicle-internal sensor device 110, which typically not only includes a corresponding 3D scanner 120 and an odometry measuring device 130 but also at least one further environment sensor such as a video camera 140, a sensor for satellite navigation 150, a radar sensor 160, or an ultrasonic sensor 170. Control device 180 of vehicle 200 is developed to evaluate data acquired with the aid of environment sensors and to further process the data. In this particular example, odometry measuring device 130 developed for ascertaining the driven distance includes a wheel-based vehicle odometry 132, which ascertains the traveled distance on the basis of the movement of wheels 210 relative to road 301. In addition, odometry measuring device 130 includes an inertial measuring unit 131 by which rotations and accelerations of vehicle 200 while in motion are ascertained. The traveled distance results from an integration of the measured accelerations across the driving time. Vehicle 200 preferably is an autonomous or automated vehicle such as an autonomous shuttle for transporting persons, or an AGV. Moreover, vehicle 200 may also be embodied in the form of a mobile robot.

In addition to vehicle odometry 132 based on a measurement of the rotational wheel speed, it is basically also possible, for example, to use for the 6-DOF odometry system other odometry methods for measuring the traveled distance, e.g., a visual odometry based on an evaluation of video data or lidar or radar odometry based on an evaluation of lidar or radar data.

Although the present invention has been illustrated and described in detail by the preferred exemplary embodiments, the present invention is not restricted by the disclosed examples. Instead, one skilled in the art may also derive other variations therefrom without departing from the protective scope of the present invention.

What is claimed is:

1. A method for simultaneous localization and mapping in two dimensions (2D) using a three-dimensional (3D) scanner, the method comprising:
   scanning an environment using the 3D scanner to generate a three-dimensional representation of the environment in a form of a 3D pixel cloud made up of a multitude of scanned pixels;
   generate a two-dimensional representation of the environment in a form of a 2D pixel cloud from the 3D pixel cloud;
   conveying the 2D pixel cloud to a 2D Simultaneous Localization and Mapping (SLAM) algorithm to generate a map of the environment and to simultaneously ascertain a current position of the 3D scanner within the map;
   initializing a known starting position for the localization;
   after the initializing, subsequently setting up a SLAM graph with an initial node and an allocated unary factor, which encodes the initial position; and
   predicting the current position for each current scan using a currently ascertained odometry datum.

2. The method as recited in claim 1, wherein a compensation of a movement which the 3D scanner has executed during the scanning is carried out, and an odometry datum is first ascertained, which represents a displacement of the 3D scanner in six degrees of freedom, and the current position of the 3D scanner is then determined for each measured scanning point of the 3D pixel cloud based on the odometry datum during a measurement of the respective pixel, and the measured pixel is then determined therefrom.

3. The method as recited in claim 2, wherein the odometry datum is generated by fusing measuring data of a vehicle odometry with measuring data of an inertial measuring unit.

4. The method as recited in claim 1, wherein the 3D pixel cloud is transformed into a coordinate system having a z-axis aligned in parallel with a direction of gravity.

5. The method as recited in claim 1, wherein vertical structures are extracted based on the 3D pixel cloud in that a normal estimate is carried out for each pixel of the 3D pixel cloud and particular pixels of the 3D pixel cloud whose normal component in a vertical direction is greater than a predefined threshold value are then discarded.

6. The method as recited in claim 1, wherein the 3D pixel cloud is projected into a two-dimensional coordinate system in that a vertical component is discarded for each of scanning point of the 3D pixel cloud.

7. The method as recited in claim 1, wherein a number of pixels of the 3D pixel cloud is reduced using a Voxel filter and/or by regular undersampling.

8. The method as recited in claim 1, further comprising:
   carrying out scan matching with the predicted current position as a starting estimate; and
   generating a new node in the SLAM graph with a binary edge to a preceding node and the scan matching as a unary edge.

9. A system simultaneous localization and mapping in two dimensions (2D) using a three-dimensional (3D) scanner, comprising:
- a 3D scanner which is configured to generate a three-dimensional representation of an environment in a form of a 3D pixel cloud; and
- a control device for the simultaneous localization and matching in 2D, wherein the control device is configured to generate from the 3D pixel cloud a two-dimensional representation of the environment in a form of a 2D pixel cloud, and the control device configured to convey the 2D pixel cloud to a 2D SLAM (Simultaneous Localization and Mapping) algorithm for generation of a two-dimensional map of the environment and a simultaneous ascertainment of a current position of the 3D scanner within the map;
- wherein a known starting position is initialized for the localization,
- wherein, after the initializing, a SLAM graph is subsequently set up with an initial node and an allocated unary factor, which encodes the initial position, and
- wherein the current position for each current scan is predicted using a currently ascertained odometry datum.

10. The system as recited in claim 9, further comprising:
- an odometry measuring device configured to ascertain an odometry datum, which represents a displacement of the 3D scanner during a scanning operation in six degrees of freedom;
- wherein the control device is configured to compensate for a movement of the 3D scanner, and the control device is configured to determine for each scanned pixel of the 3D pixel cloud, the current position of the 3D scanner during a measurement of the respective pixel based on the odometry datum and then to determine the measured pixel therefrom.

11. The system as recited in claim 9, wherein the control device is configured to transform the 3D pixel cloud into a coordinate system whose z-axis is aligned in parallel with a direction of gravity.

12. The system as recited in claim 9, wherein the control device configured to extract vertical structures based on the 3D pixel cloud in that a normal estimate is carried out for each pixel of the 3D pixel cloud and particular pixels of the 3D pixel cloud are then discarded whose normal component in a vertical direction is greater than a predefined threshold value.

13. A vehicle, including a system for simultaneous localization and mapping in two dimensions (2D) using a three-dimensional (3D) scanner, comprising:
- a 3D scanner which is configured to generate a three-dimensional representation of an environment of the vehicle in a form of a 3D pixel cloud; and
- a control device for the simultaneous localization and matching in 2D, wherein the control device is configured to generate from the 3D pixel cloud a two-dimensional representation of the environment in a form of a 2D pixel cloud, and the control device configured to convey the 2D pixel cloud to a 2D SLAM (Simultaneous Localization and Mapping) algorithm for generation of a two-dimensional map of the environment and a simultaneous ascertainment of a current position of the 3D scanner within the map;
- wherein a known starting position is initialized for the localization;
- wherein, after the initializing, a SLAM graph is subsequently set up with an initial node and an allocated unary factor, which encodes the initial position; and
- wherein the current position for each current scan is predicted using a currently ascertained odometry datum.

14. The system as recited in claim 13, wherein scan matching is carried out with the predicted current position as a starting estimate, and wherein a new node in the SLAM graph is generated with a binary edge to a preceding node and the scan matching as a unary edge.

15. The system as recited in claim 9, wherein scan matching is carried out with the predicted current position as a starting estimate, and wherein a new node in the SLAM graph is generated with a binary edge to a preceding node and the scan matching as a unary edge.

* * * * *